Jan. 29, 1963 — H. A. LINDGREN — 3,075,393
DAMPING AND ALIGNING APPARATUS
Filed Dec. 5, 1958 — 3 Sheets-Sheet 1

INVENTOR.
HAROLD A. LINDGREN
BY Roger W. Jensen
ATTORNEY

Jan. 29, 1963   H. A. LINDGREN   3,075,393
DAMPING AND ALIGNING APPARATUS
Filed Dec. 5, 1958   3 Sheets-Sheet 2

*INVENTOR.*
HAROLD A. LINDGREN
BY Roger W. Jensen
ATTORNEY

Jan. 29, 1963  H. A. LINDGREN  3,075,393
DAMPING AND ALIGNING APPARATUS
Filed Dec. 5, 1958  3 Sheets-Sheet 3

FIG 3

SWITCH 87
F- FAST LEVEL ALIGNMENT
R- RATE DAMPED LEVEL ALIGNMENT
N- NORMAL OPERATION

INVENTOR.
HAROLD A. LINDGREN
BY
ATTORNEY

3,075,393
DAMPING AND ALIGNING APPARATUS
Harold A. Lindgren, St. Paul, Minn., assignor to Minneapolis-Honeywell Regulator Company, Minneapolis, Minn., a corporation of Delaware
Filed Dec. 5, 1958, Ser. No. 778,444
5 Claims. (Cl. 74—5.34)

This invention relates to inertial navigation systems and more specifically to apparatus for initially aligning such systems.

An inertial navigation system for a vehicle includes a level platform which carries a pair of linear accelerometers oriented for sensitivity to accelerations in orthogonal directions aligned with north and east. When each accelerometer output is twice integrated the result is the amount of displacement of the vehicle during the interval of integration. The platform must be maintained level as the vehicle moves around the earth: this can be done by gyro-stabilizing the platform and precessing the stabilizing gyro eqjuipment in accordance with the displacement signals.

Because of the double integration, each accelerometer-gyro loop is subject to undamped oscillations if disturbed, and in general any acceleration results in a disturbance. A special case has been found by Schuler, however, when the natural period of the accelerometer loop is made to have the value $P=2\pi\sqrt{R/g}$ seconds per cycle or equals $\sqrt{R/g}$ seconds per radian corresponding to a natural frequency of $$f=\frac{1}{2\pi} g/R \text{ cycles per second or}$$

$\omega=\sqrt{g/R}$ radians per second, where $g$ is the acceleration of gravity and R is the radius of the earth: under these conditions the loop is not disturbed by tangential accelerations if the platform is level. This is known as Schuler-tuning of the loop: the Schuler frequency is about .0002 cycle per second or about .0013 radian per second, and the Schuler period is about 84 minutes per cycle or about 13 minutes per radian.

With high quality accelerometers and gyros a Schuler-tuned inertial systems maintains its platform accurately level, and gives accurate displacement outputs, for long periods of time, once the level condition of the platform has been established. Highly precise initial leveling is necessary, however, because if the platform is not truly level the acceleration of gravity has components effective on the accelerometers to disturb the loops and set up oscillations which thereafter continue at the Schuler frequency. The required precision of alignment can not always be satisfied practically, by physical and/or optical means alone. However, with minor modifications, and with the introduction of certain system velocitiy signals which are derived externally, where the aircraft is on a moving base such as an aircraft carrier, the system can be made to align and settle itself quite satisfactorily. By definition, the inertial platform is level when the accelerometers mounted thereon sense no component of gravity, and is aligned in azimuth when the input axis of an east gyro, also mounted on the platform, points east or west. Alignment of the platform may be accomplished generally by either of two methods, one of which is known as an external alignment, and the other of which is known as damping or self-settling. In the case of alignment of the platform externally, it is necessary to compare the angles between the platform and its gimbals with external or reference data, and for most operations this becomes somewhat unwieldy, especially where the aircraft may be aboard a moving base such as an aircraft carrier. However, optical alignment is not generally practicable.

One way in which a Schuler-tuned system can be modified for self-settling is to employ a type of level alignment hereafter referred to as "Rate-Damped" level alignment. In the Rate-Damped mode of operation, level alignment is obtained by comparing the north and east computed velocities with equivalent velocity components of the platform which have been externally derived. Of course, where the platform is aligned upon a non-moving base, the external velocity is of zero magnitude. Difference signals between the system velocity and external velocity are produced and these signals are passed through rate networks which are in the form of differentiating circuits. These signals are then sent to the platform to damp the Schuler loops.

Certain features of the Rate-Damped mode make it desirable to use some other means for self-alignment. For example, the physical realization of the differentiating circuit requires capacitors which for proper stability and sufficient capacitance involve significant bulk. Furthermore, noise amplitudes are amplified by the differentiating circuit and may cause undesirable non linearity if any element of the circuit is saturated.

A new and simpler method of aligning an inertial system has been found and this is known as "Fast-Level Alignment." In the Fast-Level Alignment mode of operation apparatus is used to effectively reduce the order of the system, allowing higher damping loop gains and shorter alignment times. The order of this system is effectively reduced by closing loops around the integrating accelerometers and thus converting the integrations into first order time lags. Decreased solution time is achieved by increasing the undamped natural frequency of the system beyond the Schuler frequency, that is, by shortening the natural period of the servo loop. This is accomplished in principle by increasing the gain of the loop between the accelerometer-integrator and the gyro torquer. This produces an increased torquing rate which results in an appreciable reduction in alignment time.

For some operations there are advantages in sequentially combining the operation of the Rate-Damped level alignment and Fast-Level alignment modes of operation.

It is therefore the general object of this invention to provide improved means for damping and aligning an inertial navigation system.

It is another object of the present invention to provide damping means for a Schuler-tuned system which will result in a solution time inversely proportional to the damping gains.

It is still a further object of the present invention to provide means by which a Schuler-tuned system may be aligned in approximately one tenth of the normal Schuler period.

It is yet another object of the present invention to provide fast damping and alignment apparatus which may be combined sequentially with rate damping apparatus to initially align a Schuler-tuned system.

It is still another object of the present invention to provide a new method of damping and aligning the leveling system of an inertial platform which includes servomechanisms of the second order.

These and other features of the invention will be understood more clearly and fully from the following detailed description and accompanying drawing in which:

FIGURE 3 is a block diagram of an inertial platform employing a Schular-tuned system in combination with the Rate-Damping apparatus and the Fast-Level aligning apparatus.

Figure 1:
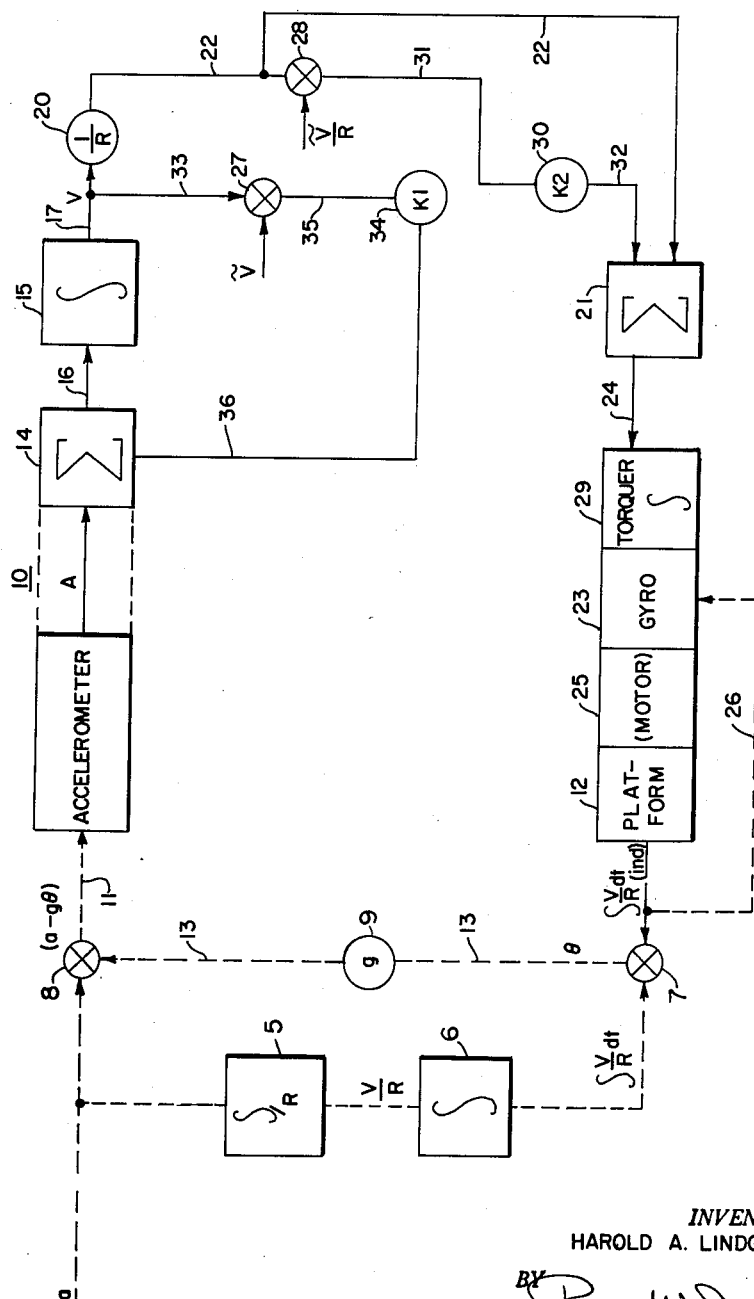
FIGURE 1 is a block diagram of a simplified Schular-tuned system containing the Fast-Level alignment apparatus and neglecting the effects of cross-coupling.

The block diagram of FIGURE 1 shows a system adapted to be mounted in a vehicle such as an aircraft for movement on or above the earth's surface. A linear accelerometer 10 having an axis of sensitivity 11 is rigidly mounted on a platform 12 gimballed to the vehicle for positioning with respect thereto so that axis 11 may be made tangential to the earth's surface regardless of the attitude of the aircraft. If the axis 11 is not truly horizontal, the accelerometer is additionally responsive to the acceleration of gravity in proportion to the different $\theta$ between the direction of the normal to the axis 11 and the direction of the true vertical, and given an output A having the value $a-g\theta$ where $a$ is the component of aircraft acceleration acting along the axis 11. When the platform is level, $g\theta$ becomes zero and A becomes equal to $a$.

Assuming the two directions to be initially coincident, the value of $\theta$ after an interval becomes the difference between the change in direction of the true vertical and the change in direction of the normal to axis 11. The change in direction of the true vertical is measured by the quotient of the second integral of tangential acceleration divided by the radius of the earth, while the change in direction of the normal to axis 11 is measured by the quotient of the second integral of the accelerometer output divided by the radius of the earth. The difference between these two quotients, multiplied by $g$, is the error introduced by the acceleration of gravity into the accelerometer output when the platform is not level.

FIGURE 1 shows these relationships explicitly, and includes an integrator and divider 5, a second integrator 6, a pair of differentials 7 and 8, and a gravity setting device 9. In practice the accelerometer inherently gives an output representative of $a-g\theta$, and the functions of the elements 5–9 are performed by the movement of the vehicle itself.

The acceleration output A from accelerometer 10 is supplied as an input to a summing device 14 which is generally a part of accelerometer 10 and may be physically found as a torque motor within the accelerometer. One accelerometer of this type is shown and described in the co-pending application of Vernon H. Aske et al., Serial No. 774,952, filed November 19, 1958, now Patent No. 2,978,219 entitled "Control Apparatus," and assigned to the assignee of the present application.

The output of summing device 14 is supplied through a connection 16 to an integrator 15 where the signal is integrated and appears as a signal on an output lead 17 representative of the tangential velocity V of the aircraft. Output lead 17 is connected to a divider 20 which is generally a form of scaling device, to scale a voltage to represent division by R, the radius of the earth. For the purpose of illustration it has been assumed that the earth is a spherical body so that its radius R has a constant value. The output from divider 20, representative of the angular velocity of the vehicle about the center of the earth, is sent to a summing device 21 through a connecting lead 22, and the output of the summing device is sent to a second integrator comprising the torque motor 29 of a single-degree-of-freedom gyro 23, through a connecting lead 24. Gyro 23 is rigidly mounted on platform 12 and may be an integrating gyro such as is shown in Jarosh et al. Patent 2,752,791: it is connected to control a gimbal servomotor 25 which positions platform 12 with respect to the vehicle carrying it. As platform 12 is erected a balancing force 26 is applied by torquer 29. The output of platform 12 is then the indicated change of the local vertical with respect to inertial space, and if platform 12 is level, the output is the true change of local vertical as well. The apparatus just described constitutes one channel of an inertial navigation system without damping, and has the transfer function $$\frac{1}{S^2+\omega_n^2}$$

where S is the complex variable in the notation of La Place transforms and $\omega_n$ is the natural frequency of the system in radians per second. To prevent the apparatus from being thrown into oscillation by the accelerations to which it is designed to respond, Schuler tuning is used, that is, the components are so selected that $\omega_n^2$ has the value $g/R$.

The platform is now stable to tangential accelerations as long as it remains level. Deviation of the platform from level introduces to one or both accelerometers a component of the acceleration of gravity against which the system is not stable. This can be overcome by initially applying suitable damping and gain modifications to the system, thus leveling the platform and reducing $\theta$ to zero. Means for modifying the system to accomplish this will now be described.

Signals representative of $\tilde{V}$, the velocity of the base on which the aircraft is standing, measured with respect to the earth in the earth in the direction of axis 11, and of $\tilde{V}/R$, are supplied as inputs to a pair of differentials 27 and 28 by some means external to the inertial system. For a land based aircraft both of these signals are zero. Differential 28 has a second input from lead 22 and is connected to a gain device 30 through a connecting lead 31. Gain device 30 is connected to summing device 21 through lead 32, and has a gain $K_2$ which is large compared to the normal unity gain of the gyro input through connection 22. This same terminology will be applied later in regards to $K_2$ in the Schuler-tuned loop including a north gyro and east accelerometer.

The signal on lead 31 is representative of the quantity $V/R-\tilde{V}/R$, that is, of the error in the indicated angular velocity of the aircraft about the center of the earth. If the platform is level, A is equal to $a$, $V/R$ is equal to $\tilde{V}/R$, normally zero, and the error is zero. The formula describing the undamped natural frequency of the modified Schuler-tuned system is now $$\omega_n^2 = (K_2+1)\frac{g}{R}$$

if the gain of device 30 is 100, for example, the natural frequency of the modified system is approximately 10 times that of the unmodified system. The speed of response of modified system is accordingly greatly increased, so that settling or leveling of the system can take place more rapidly. If the platform is not level, A is equal to $a-g\omega$, $V/R$ departs from equality with $\tilde{V}/R$ by the factor $g\omega$, and the input at 24 to torquer 29 has an additional component. Platform 12 is thus driven to reduce $\theta$ to zero. As the process goes on the value of A approaches $a$, and that of $V/R$ approaches that of $\tilde{V}/R$, until the system reaches balance with A once more equal to $a$.

Damping is added to the system by supplying the velocity signal $\tilde{V}$ as a first input to differential 27. Differential 27 has a second input from lead 33, and is connected to a gain device 34 through a connecting lead 35. Gain device 34 is connected to summing device 14 through a connecting lead 36 and has a gain of $K_1$.

The signal on lead 35 is representative of $V-\tilde{V}$, that is, of the error in the indicated tangential velocity of the aircraft with respect to the earth's surface. Once again if the platform is level A is equal to $a$ and V is equal to $\tilde{V}$, normally zero, and accordingly the error is zero. The effect of elements 27, 33, 34, 35, and 36 is to close a loop around integrator 15, thus converting it to a first order time lag. The overall system is no longer undamped, and its transfer function becomes $$\frac{1}{s^2+2\zeta\omega_n S+\omega_n^2}$$

where the additional quantity $\zeta$ is the damping factor of the system. It can be shown that $K_1=2\zeta\omega_n S$, and by setting $K_1$ properly any desired damping factor may be selected for the system.

If the platform is not level A is not equal to $a$, V is not equal to $\tilde{V}$, and a signal $\epsilon$ is now supplied through lead 36 to summing device 14. The input to integrator 15 is now $A-\epsilon$ instead of A and the output at 17 changes accordingly, affecting not only a signal at lead 36, but that at 24. Operation of torque motor 29 repositions platform 12, changing the value of A by reducing $\omega$. This operation continues, at the increased rate due to components 28, 30, 31 and 32, until the platform is level when $\theta$ becomes zero, A is equal to $a$, V is equal to $\tilde{V}$, and $V/R$ is equal to $\tilde{V}/R$. Opening of leads 32 and 36 can now restore the system to an unmodified Schuler-tuned loop, and normal operation of the inertial navigation system follows. For the particular instance where $K_2$ took on a value of 100, $\zeta$ has a value of 0.70 and $K_1$ then has a value of approximately 0.17. The values given here are given for a particular system such as that shown in the co-pending application of Alderson et al., Serial No. 778,090, filed on December 4, 1958, and assigned to the assignee of the present application. The lower limit on the period of operation is determined by the servo configuration as too high settings of gain device $K_2$ may cause saturation of the electronic components of the system with resulting non-linear operation. The gains $K_1$ and $K_2$ can be adjusted to produce an optimum solution time for any given set of conditions. Solution time may be defined as the time for a transient condition to reduce to approximately five percent of its initial value.

It is of course understood, as illustrated in detail in FIGURE 3, that once the platform is aligned the inputs to summing devices 14 and 21 on leads 36 and 32 are interrupted to establish normal operating conditions.

Figure 2:
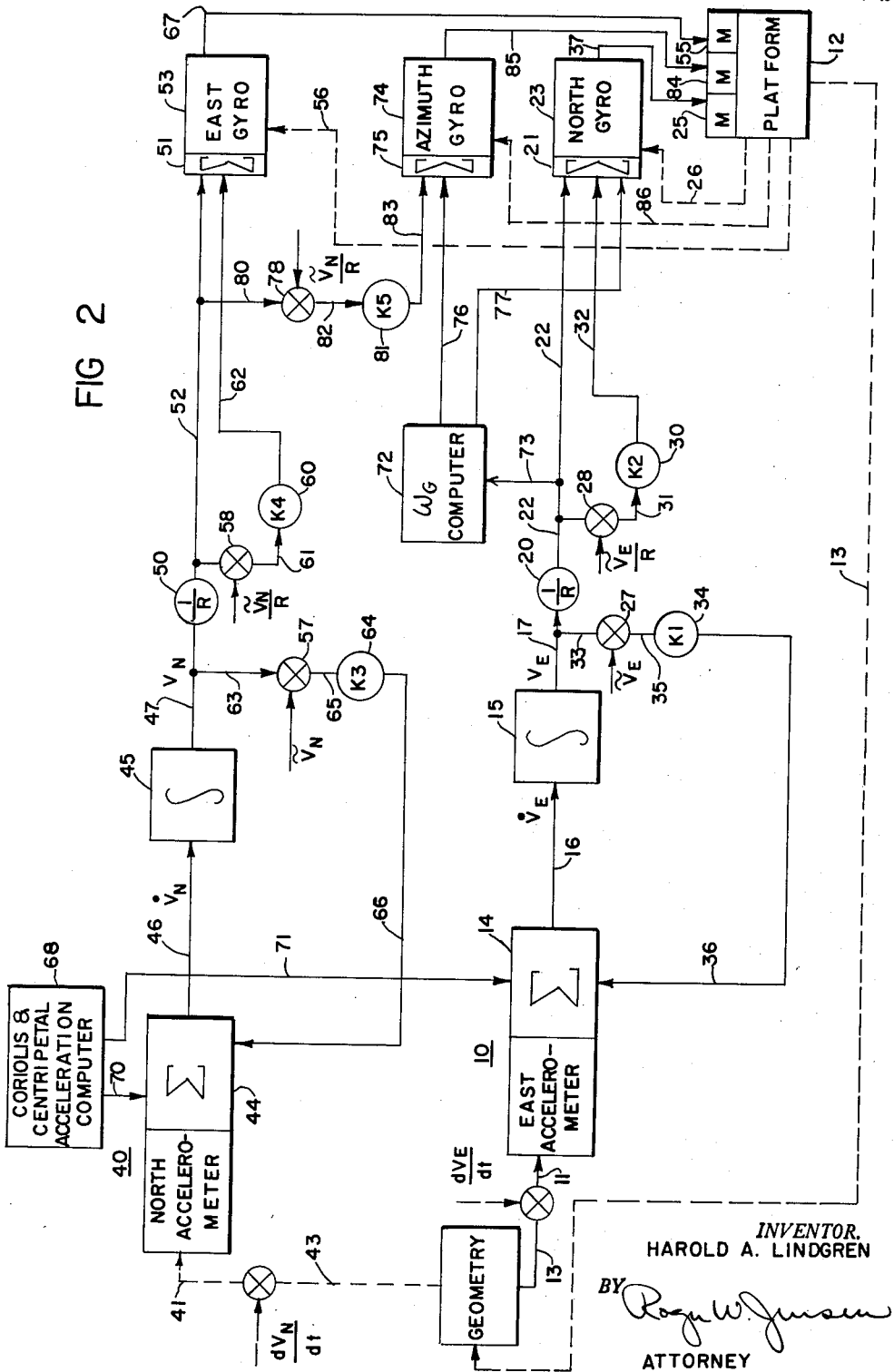
FIGURE 2 is a block diagram of an inertial platform employing a pair of tuned Schular loops or systems in combination with the Fast-Level alignment apparatus.

FIGURE 2 discloses an inertial navigation system comprising a pair of basic Schuler-tuned loops in which the apparatus just described is shown as the loop containing an east accelerometer and north gyro and having independent inputs of $\tilde{V}_N$ and $\tilde{V}_N/R$: the same reference numerals have been used to identify the same components. The other loop in FIGURE 2, which is made up of another accelerometer designated as north accelerometer 40 and another gyro designated as east gyro 53, completes the two leveling loops generally associated with an inertial platform. Since the two loops are essentially the same, the reference numeral for each element in the second loop is determined by adding 30 to the reference numeral for the equivalent element in the first loop, going from 40 to 66. In FIGURE 2 the connection between motor 25 and gyro 23 is shown explicitly at 37, and a similar connection 67 is shown between motor 55 and gyro 53. Summing devices 21 and 51 are shown physically connected to gyros 23 and 53 respectively thereby eliminating any connecting leads. A Coriolis and centripetal acceleration computer 68 is shown providing input signals to summing devices 14 and 44 through a pair of connecting leads 70 and 71 respectively.

Since an inertial platform is also required to be oriented in azimuth, means for aligning the inertial platform with respect to a given reference such as north is provided and will be briefly described. This azimuth loop is connected to the Schuler-tuned loop containing the north accelerometer 40 and east gyro 53 to produce a third order system, but the effect upon the second order system involving north accelerometer 40 and east gyro 53 is comparatively small. In other words, the addition of the azimuth loop to the Schuler loop does not appreciably upset the second order system just previously described.

In the azimuth loop, an azimuth gyro precession signal computer 72 is connected to lead 22 through a connecting lead 73 and produces a signal which is used to precess an azimuth gyro 74 so that platform 12 is oriented in a north direction regardless of the velocity and position of the system relative to the earth. Computer 72 is connected to supply a first input to a summing device 75, which is a part of azimuth gyro 74, through a connecting lead 76 and to summing device 21 through a connecting lead 77. Computers 68 and 72 function primarily in the navigation mode of the system rather than during initial alignment of the system, and hence are shown only in a generally illustrative manner. For initial alignment of the azimuth loop a signal is obtained from lead 52 which is sent to a differential 78 through a connecting lead 80 to be compared with an externally derived signal of magnitude $\tilde{V}_n/R$. When the platform is at rest the external signal is zero, and the signal from lead 52 is supplied unaltered to a gain device 81 having a gain of $K_5$, through a connecting lead 82. Gain device 81 supplies an output signal to summing device 75 through a connecting lead 83. As a result azimuth gyro 74 produces an output signal; the signal is sent to a servo motor 84 through a connecting lead 85 where the servo motor 84 acts on platform 12 and thus reorients azimuth gyro 74 through a connection 86.

In describing the operation of the azimuth alignment circuit, it may be stated that a correct azimuth alignment is completed when the input axis of the east gyro is aligned with the east-west direction in the local horizontal plane of the earth. When platform 12 is displaced in azimuth from the correct alignment, the earth rate vector has a small component along the input axis of east gyro 53 causing an apparent drift of the platform away from level. North accelerometer 40, which moves with platform 12, receives a component of gravity and platform leveling as described takes place. The signal at 52, when compared with the true value of $\tilde{V}_N/R$ in differential 78, also yields an error signal capable of precessing platform 12 to a correct azimuth orientation through the torque motor of azimuth gyro 74. The system reaches equilibrium when both the leveling and azimuth portions are properly aligned at the same time.

As mentioned previously, for certain operations it may be advantageous to use the Fast-Level alignment mode operation initially and then further trim the error signals from the platform by placing the system in the "Rate Damped" mode of operation if time permits. FIGURE 3 shows an embodiment of the present invention in combination with the "Rate Damped" mode of operation and a description of this combination will now be given. The two Schuler-tuned systems as found in FIGURE 2, are shown in FIGURE 3 in combination with the rate damping apparatus. The alignment of the platform as shown in FIGURE 3 incorporates the rate settling mode of operation as a second step to alignment since the system would first be placed in the fast settling mode of operation for alignment. A switch 87 is made up of five sections designated as 87A, 87B, 87C, 87D, and 87E. Each switch section contains a switch arm which is connected by a common link 90 that is used to gang the five section of the switch. The switches are shown in the positions which select the "Rate Damped" mode of operation. The signal which appears on connecting lead 52 and at differential 58 is transmitted to switch terminal R, of switch section 87B. Switch contact R is connected to a gain device 91 through a connecting lead 92 and the output of gain device 91 is connected to a differentiating network 93 through a connecting lead 94. Differentiating network 93 is of the common capacitor and resistor type, and produces essentially a differentiated signal: this signal is supplied to connecting lead 62 by a connecting lead 95. The apparatus just described has a counter-part in the other loop, and this is shown where a gain device 101 is connected to terminal R of switch section 87E through a connecting lead 102 and is connected to lead 32 by lead 105. The system is operated in this mode until the signals emerging from leads 95 and 105 are substantially of a zero value or at a point where only circuit noise reaches the gyros and at this time switch 87 is rotated to the normal mode of operation designated by N. The noise just mentioned is an inherent noise developed in the two differentiating circuits 93 and 103. It will be remembered that there is an upper limit on the gain and lower limit on the settling time in this mode of operation since the Schuler loop remains operating as a second order system and therefore the gains, $K_6$ and $K_8$ of gain devices 91 and 101 are necessarily limited.

The gain devices mentioned herein may be in the form of amplifiers which may be of any standard form employing electron tubes, transistors, or other such components which are capable of producing an output signal of greater magnitude than the input signal.

While I have shown and described certain specific embodiments of this invention, the invention should not be limited to the particular forms shown, and I intend in the appended claims to cover all modifications which do not depart from the spirit and scope of the invention.

What I claim is:

1. In apparatus for automatically leveling the platform of an inertial navigation system including a pair of closed servo loops each with a natural period of about 84 minutes and each having an integrating accelerometer carried by the platform, the improvement which comprises:
   an additional loop constituting feedback means associated with each said integrating accelerometer for converting the integration function thereof to a first order lag;
   further means in each said loop for greatly shortening the natural period thereof; and
   means connected to said feedback means and said further means for disabling said additional loop and said further means.

2. In apparatus for automatically aligning in azimuth the platform of an inertial navigation system including
   a precessible azimuth gyro and
   a closed servo loop having
      a natural period of about 84 minutes,
      a precessible east gyroscope,
      an integrating north accelerometer giving a rate signal output, and
      means supplying said output to said east gyroscope to cause precession thereof, said accelerometer and said gyroscopes being carried by the platform,
   the improvement which comprises:
   an additional loop constituting feedback means associated with said integrating accelerometer for converting the integration function thereof to a first order lag;
   further means in said first loop for greatly shortening the natural period thereof; and
   electrical means supplying said output to said azimuth gyro to cause precession thereof.

3. In apparatus for automatically aligning in azimuth the platform of an inertial navigation system including
   a precessible azimuth gyro and
   a closed servo loop having
      a natural period of about 84 minutes,
      a precessible east gyroscope,
      an integrating north accelerometer giving a rate signal output and
      means supplying said output to said east gyroscope to cause precession thereof, said accelerometer and said gyroscope being carried by the platform,
   the improvement which comprises:
   an additional loop constituting feedback means associated with said integrating accelerometer for converting the integration function thereof to a first order lag;
   further means in said first loop for greatly shortening the natural period thereof;
   electrical means supplying said output to said azimuth gyro to cause precession thereof; and
   means connected to the last named means, said feedback means, and said further means for disabling the last named means, said additional loop, and said further means.

4. In apparatus for automatically aligning in azimuth the platform of an inertial system including
   a precessible azimuth gyroscope;
   a first closed servo loop having
      a natural period of about 84 minutes,
      a precessible east gyroscope,
      an integrating north accelerometer giving a rate signal output, and
      means supplying said output to said gyroscope to cause precession thereof; and
   a second closed servo loop having
      a natural period of about 84 minutes,
      a precessible north gyroscope,
      an integrating east accelerometer giving a second rate signal output, and
      means supplying said second output to said north gyroscope to cause precession thereof, said gyroscopes and said accelerometers being carried by the platform,
   the improvement which comprises:
   an additional loop constituting feedback means associated with each said intergrating accelerometer for converting the integration function thereof to a first order lag;
   further means in each of said first loops for greatly shortening the natural period thereof; and
   electrical means connecting said first rate output to said azimuth gyroscope to cause precession thereof.

5. In apparatus for automatically aligning in azimuth, the platform of an inertial system including
   a precessible azimuth gyroscope;
   a first closed servo loop having
      a natural period of about 84 minutes,
      a precessible east gyroscope,
      an integrating north accelerometer giving a rate signal output, and
      means supplying said output to said gyroscope to cause precession thereof; and
   a second closed servo loop having
      a natural period of about 84 minutes,
      a precessible north gyroscope,
      an integrating east accelerometer giving a second rate signal output, and
      means supplying said second output to said north gyroscope to cause precession thereof, said gyroscopes and said accelerometers being carried by the platform, the improvement which comprises:

an additional loop constituting feedback means associated with each said integrating accelerometer for converting the integration function thereof to a first order lag;

further means in each said first and second loops for greatly shortening the natural period thereof;

electrical means connecting said first rate output to said azimuth gyroscope to cause precession thereof; and means connected to the last named means, said feedback means, and said further means for disabling the last named means, said additional loop, and said further means.

References Cited in the file of this patent

UNITED STATES PATENTS

| | | |
|---|---|---|
| 2,752,792 | Draper et al. | July 3, 1956 |
| 2,944,426 | Amora | July 12, 1960 |
| 2,946,539 | Fischel | July 26, 1960 |
| 2,948,157 | Sedgfield | Aug. 9, 1960 |
| 2,953,926 | Wrigley et al. | Sept. 27, 1960 |